INVENTOR.
Robert R. Lester.
BY
Fishburn & Mullendore
ATTORNEYS.

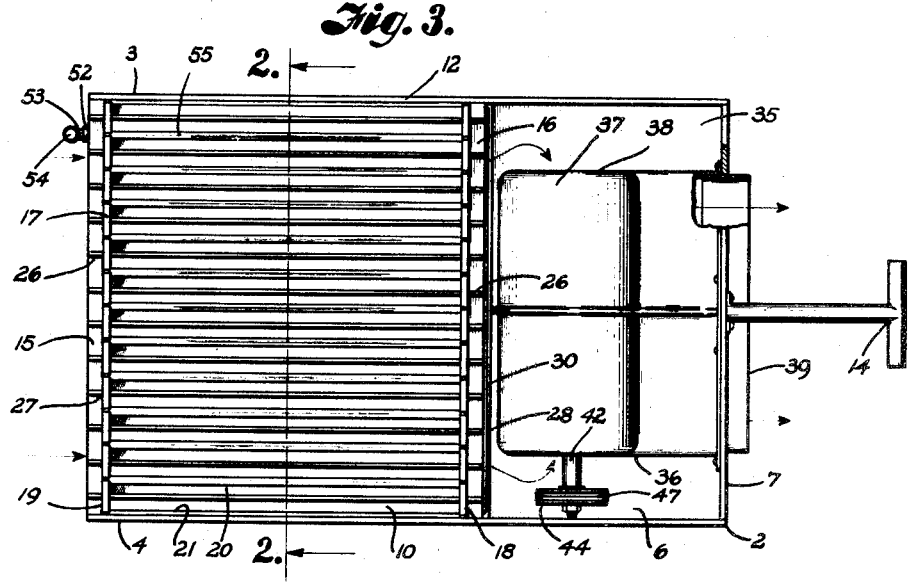
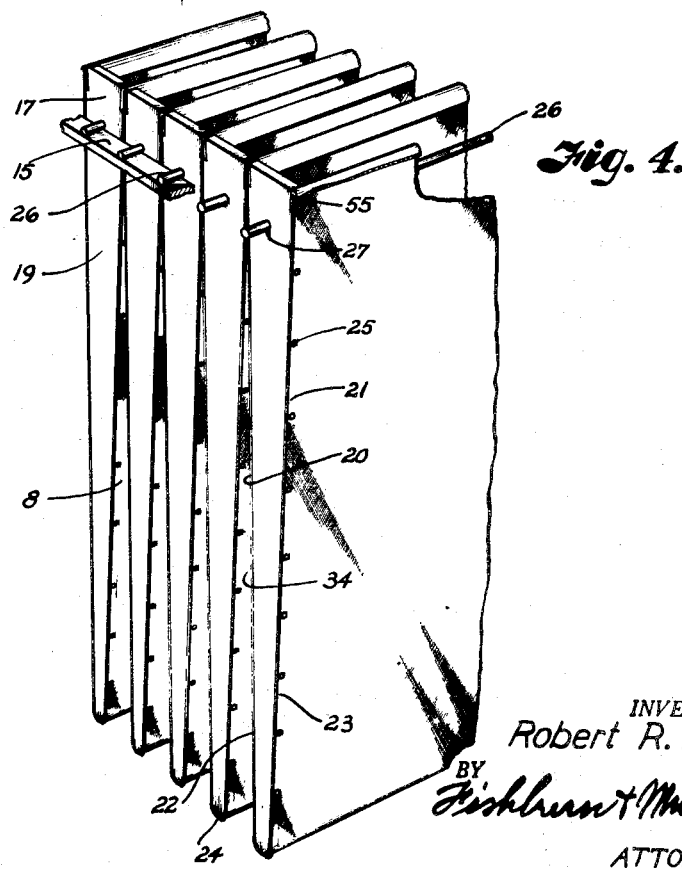

United States Patent Office 2,776,723
Patented Jan. 8, 1957

2,776,723
PORTABLE DEHYDRATOR

Robert R. Lester, Kansas City, Mo., assignor to Kansas City Terminal Warehouse Company, Kansas City, Mo., a corporation of Missouri Application August 23, 1955, Serial No. 530,177

3 Claims. (Cl. 183—4)

This invention relates to a dehydrator particularly adapted for drying air in warehouses where food products, such as sugar, are stored and must be kept under low humidity conditions. A food product, such as sugar, is usually stored in sacks that are stacked in piles with passageways or aisles being maintained therebetween for convenience of access and for air circulation. Unless sugar is kept under a constantly low humidity condition, it cakes or hardens in the sacks and becomes practically useless for ordinary purposes and must be salvaged at a substantial loss. Since warehouse space is usually a factor, the aisles are kept relatively narrow with the result that humidity conditions may tend to vary in various parts of the storage room, particularly where the room is large and the stock is being removed and replaced.

Therefore, the principal object of the present invention is to provide a small, compact and preferably portable dehydrating unit that is readily manipulated through the aisles to various positions within a storage room, as may be required to maintain the desired humidity.

Other objects of the invention are to provide a dehydrator with cells for containing a drying agent of deliquescent character and which cells have downwardly converging sides to provide relatively wide upper portions and relatively narrow lower portions to facilitate charging of the cells and to form inversely shaped passageways therebetween; to provide the dehydrator with cells having maximum surface areas for contact by relatively large volumes of moisture laden air which is divided into a plurality of relatively thin streams of air with each stream being conducted through a passageway between the adjacent cells; to provide cells with foraminous sides providing run-offs for the resulting liquid at many points along the height of the cells where the liquid collects in sufficient quantities to produce drips, thereby maintaining optimum efficiency of the drying agent throughout the depth of the cells; to provide a cell structure that is readily installed within a portable housing and removed therefrom for replacement and repair when necessary; to provide a dehydrator having a moisture collecting pan under the lower portion of the cells for collecting the liquid which results from the deliquescent action of the drying agent; and to provide a flow outlet for the pan so that the pan may be readily drained when the unit is trundled over a floor drain which leads to a sewer or other source of disposal.

It is also an object of the invention to provide an air circulating unit operated by a motor that may be plugged into any convenient wall outlet.

In accomplishing these and other objects of the invention, as hereinafter pointed out, I have provided improved structure, the preferred form of which is illustrated in the accompanying drawings, wherein:

Fig. 3 is a horizontal section on the line 3—3 of Fig. 2, to illustrate the cells in plan view and to show the air circulator.

Fig. 4 is a detail fragmentary view of one end of a group of cells.

Figure 1:
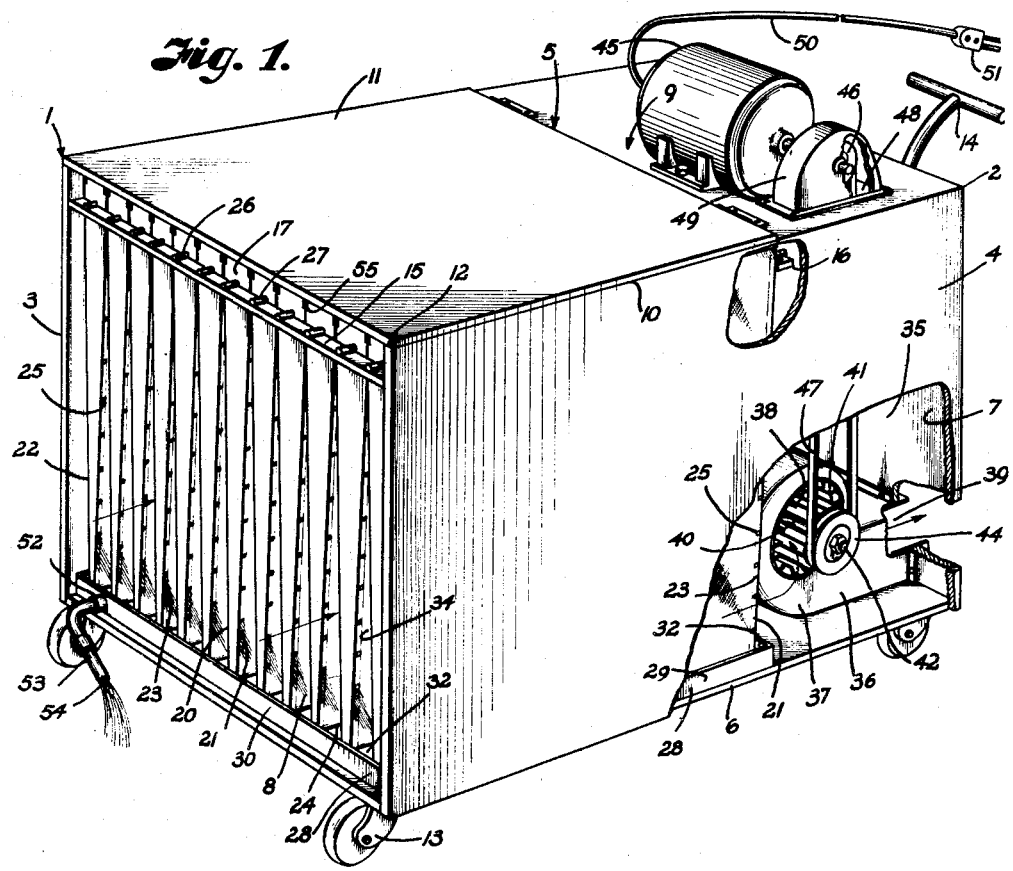
Fig. 1 is a perspective view of a portable dehydrator constructed in accordance with the present invention, a part of the housing being broken away to show support of the cells and the air circulator.

Referring more in detail to the drawings:

1 designates a dehydrator constructed in accordance with the present invention and which includes a rectangular housing or casing 2 having side walls 3 and 4, a top 5, a bottom 6, a closed end wall 7, and an open end 8. The top 5 includes a fixed desk section 9 spaced forwardly from the open end 8 to provide an opening 10 therebetween, preferably the full width of the housing. The opening 10 is normally covered by a hinged deck or door 11 that is adapted to rest upon the upper edges 12 of the side walls 3 and 4. The housing is mounted on casters 13 to facilitate mobility of the dehydrator and the forward end has a tongue 14 by which the dehydrator may be pulled through the aisles in a warehouse to different locations where dehydration is desired. Extending transversely between the side walls 3 and 4 at the respective ends of the opening 10 are transverse rails 15 and 16 for suspendingly supporting a plurality of cells 17.

Each of the cells 17 is of identical construction and includes front and rear ends 18—19 and sides 20—21. The ends are preferably formed of wood or other material which is not affected by the solution which results by the action of the drying agent. The ends 18 and 19 of the cells have downwardly converging side edges 22 and 23 that terminate in rounding curves 24. The sides 20—21 of the cells have openings therethrough to expose the drying agent and are preferably formed of screen material that is secured to one side edge of the ends 18—19 to extend downwardly at one side 22 around the curves 24 and upwardly of the side edges 23. The screen material is selected so that it is of a type to be least affected by any chemical action that occurs within and around the cells. The edges of the screen are secured by devices, such as nails 25 which are driven into the wood ends of the cells. The top of each cell is open for filling the cells, as later described.

It is thus obvious that each of the cells comprise a relatively deep but narrow hopper having perforated sides. The cells are suspended in side to side relation and are used in sufficient number to cover the space between the side walls 3 and 4. The cells are also of a length to fill the space between the rails 15 and 16 so that when the cover 11 is hinged away from the opening 10, the tops of the exposed cells cover the area of the opening. The cells are suspended by means of rods 26 that extend through suitable openings in the ends 18 and 19 and provide projections 27 at the respective ends of the cells for support on the rails 15 and 16, as best shown in Figs. 1 and 4. Thus any one or all of the cells may be readily removed by withdrawing them through the opening 10 in the top of the housing.

Figure 2:
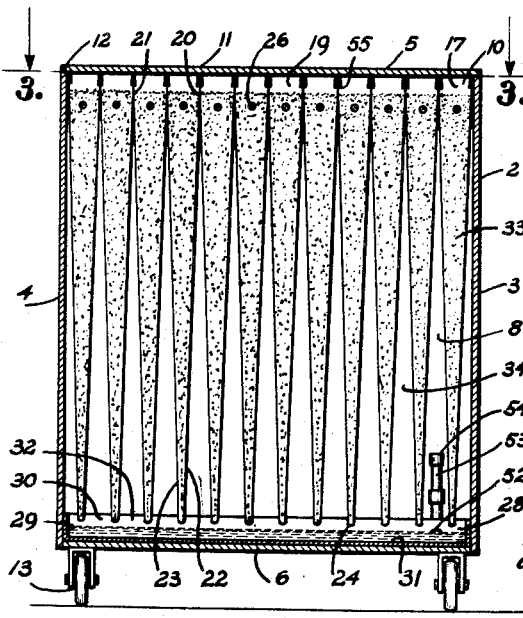
Fig. 2 is a cross section through the dehydrator on the line 2—2 of Fig. 3, particularly illustrating the shape and arrangement of the desiccant containing cells and the air passageways that are formed therebetween.

Carried on the bottom 6 of the housing and conforming in size to the opening 10, is a pan 28 having relatively shallow sides and ends 29—30 and a bottom 31, as best shown in Figs. 1 and 2. The pan has an open top 32 into which the rounding bottoms of the cells project. The bottoms of the cells, however, are supported above the level of the liquid that collects within the pan as a result of the moisture absorbent and deliquescent properties of the drying agent 33 with which the cells are filled. It is obvious that the beds of drying agent contained in the respective cells gradually reduce in cross sectional area from the top to the bottom and that the air passageways 34 between cells are inversely tapered, the passageways being wider at the bottom than the top.

The air passageways 34 connect with the open end 8 of the housing and terminate at the forward ends of the cells in connection with a chamber or compartment 35. Mounted in the lower portion of the chamber 35 is a fan or blower 36, which in the illustrated instance is of the sirocco type in that it has a casing 37 having inlets 38 at the ends and a peripheral discharge duct 39 opening through the forward end wall of the housing. Rotatably mounted within the casing 37 is a rotor 40 having a circumferential series of blades 41. The shaft 42 of the rotor 40 projects through one end of the casing 37 and carries a pulley 44.

Mounted on the fixed deck section 9 of the housing is a motor 45 having a pulley 46 to operate the rotor 40 through a belt 47 running over the pulleys 44 and 46 with the runs of the belt extending through an opening 48 in the deck section 9. The pulley 46 is preferably covered by guard 49 which closes the opening 48. The motor 45 is provided with an electrical cord 50 having a plug-in connection 51 that may be plugged into any suitable source of current supply, such as a wall socket (not shown).

The pan 28 has a fitting 52 attached to the rear wall of the pan and in which is rotatably mounted a swing pipe 53. The swing pipe 53 is of sufficient length so that when it is turned to a vertical position, the outlet 54 is above the level of the liquid and the liquid cannot flow from the pan without turning the swing pipe to a downwardly sloping position, as shown in Fig. 1, where the outlet 54 is at a lower level than the bottom of the pan. To facilitate the filling of the cells with a drying agent and prevent spilling thereof between the cells, the upper edges of the adjacent screens are covered and connected together by an inverted V-shaped strip 55.

In using a dehydrator constructed and assembled as described, the drying agent, such as calcium chloride, or similar deliquescent material is placed in the cells. This is effected by hinging the cover 11 retractively to expose the tops of the cells. The material is then poured from the sack through the open top of the housing where it spreads out to fall into the cells and fill the space between the screens thereof. The hydrator is then moved to desired position where the plug 51 on the cord 50 of the motor 45 is plugged into a suitable electrical connection to actuate the rotor 40 of the fan or blower 37. Air is then drawn from the open end 8 through the passageways 34 where it makes contact with the deliquescent material contained in the cells and the moisture in the air is attracted to the drying agent because of the deliquescent properties of the agent. The air is thus relieved of its moisture and is charged into the storage room comparatively dry. During the chemical action carried on in the cells, the drying agent dissolves and forms a solution with the moisture and the solution drips from the downwardly sloping sides of the cells wherever the collection is sufficient to form a drip. In this way the drying agent solution formed at the top of the cells does not flow through the material in the lower portion of the cells but is eliminated substantially at the points of formation.

When the pan 28 must be emptied of the solution, the hydrator is moved to a position over a suitable floor drain or similar sewer connection where the swing pipe 53 may be turned downwardly to permit the solution to flow from the pan 28 into the floor drain. At this time, the cells may be refilled with a new supply of the drying agent, as previously described so as to maintain the efficiency of the dehydrator when it is returned to the place of use.

From the foregoing, it is obvious that I have provided a portable dehydrator that is of simple construction and which is particularly adapted for eliminating excess moisture within the air of storage warehouses and similar places where low humidity conditions are desirable.

It is obvious that the dehydrator, being portable, may be readily moved through the aisles between the piles of the stored product to a position where dehydration is required to maintain the desired humidity conditions in the storage room.

While calcium chloride is mentioned as a specific drying agent, it is obvious that other deliquescent compounds may be used in the dehydrator that is constructed as above described.

Also, the castors or wheels may be omitted and the dehydrator may be made stationary and located in a fixed position if desired without departing from the spirit of the invention.

I claim:

1. A dehydrator including a casing having parallel side walls, an end wall connecting one end of the side walls and a bottom, the end of the casing opposite said end wall being open, cell supports extending transversely of the casing and inset from upper edges of the side walls, one of said supports being located at the open end and the other inset from the end wall between a dehydrating compartment on the side of the open end and a blower compartment on the side of the end wall, a plurality of elongated cells arranged in side to side relation within the dehydrating compartment, each cell having ends and foraminous side walls connected with said ends to provide a container for a hygroscopic material, means extending from said ends of the cells and engaging the cell supports to suspend the cells lengthwise within the dehydrating compartment with the side of one cell being spaced from the side of the adjacent cell to provide a plurality of elongated passageways extending from said open end to the blower compartment for conducting a plurality of streams of air into contact with said side walls of the cells, a cover on the casing closing the top of the dehydrating compartment, a deck covering the top of the blower compartment, a blower in the blower compartment having an inlet in connection with the compartment and an outlet opening through the casing, and means for actuating the blower to pull air through the passageways for contact with the hygroscopic material in said cells and into the blower compartment for discharge from the casing.

2. A dehydrator including a casing having parallel side walls, an end wall connecting one end of the side walls and a bottom, the end of the casing opposite said end wall being open, cell supports extending transversely of the casing and inset from upper edges of the side walls, one of said supports being located at the open end and the other inset from the end wall between a dehydrating compartment on the side of the open end and a blower compartment on the side of the end wall, a plurality of elongated cells arranged in side to side relation within the dehydrating compartment, each cell having ends with downwardly converging edges and foraminous side walls connected with said edges to provide a container for a hygroscopic material, means projecting from ends of the cells and engaging the cell supports to suspend the cells lengthwise within the dehydrating compartment with the side of one cell diverging from the side of the adjacent cell to provide a plurality of individual passageways extending from said open end to the blower compartment for conducting a plurality of streams of air into contact with said side walls of the cells, a cover on the casing closing the top of the dehydrating compartment, a deck covering the top of the blower compartment, a blower in the blower compartment having an inlet in direct connection with the compartment and an outlet opening through the casing, and means for actuating the blower to pull air through the passageways for contact with the hygroscopic material in said cells and into the blower compartment for discharge from the casing.

3. A dehydrator as described in claim 2 wherein the means for suspending the cells comprises a rod extending longitudinally through the cells and having projecting ends bearing upon the transverse supports, and said cells are removable through the top of the casing upon removal of the cover of the dehydrating compartment.

References Cited in the file of this patent

UNITED STATES PATENTS

| 2,306,674 | Todd et al. | Dec. 29, 1942 |
| 2,363,262 | Robinson | Nov. 21, 1944 |
| 2,366,540 | MacLean | Jan. 2, 1945 |
| 2,535,144 | Kovacs et al. | Dec. 26, 1950 |

OTHER REFERENCES

"Chemical Dehydration of Air," by The H. J. Kaufman Co., page 2.